US008345605B2

(12) United States Patent
Shen et al.

(10) Patent No.: US 8,345,605 B2
(45) Date of Patent: Jan. 1, 2013

(54) TRANSMISSION OF BUNDLED FEEDBACK IN WIRELESS NETWORKS

(75) Inventors: Zukang Shen, Richardson, TX (US); Jing Jiang, Allen, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 301 days.

(21) Appl. No.: 12/389,486

(22) Filed: Feb. 20, 2009

(65) Prior Publication Data

US 2009/0213769 A1 Aug. 27, 2009

Related U.S. Application Data

(60) Provisional application No. 61/030,373, filed on Feb. 21, 2008, provisional application No. 61/031,886, filed on Feb. 27, 2008, provisional application No. 61/034,238, filed on Mar. 6, 2008.

(51) Int. Cl.
*H04W 4/00* (2009.01)

(52) U.S. Cl. ........................ 370/329; 370/437; 370/473

(58) Field of Classification Search .................. 370/328, 370/329, 330, 332, 336, 437, 469, 524, 473; 455/450, 452.1, 452.2; 709/227
See application file for complete search history.

(56) References Cited

U.S. PATENT DOCUMENTS

| | | | | |
|---|---|---|---|---|
| 6,141,336 | A * | 10/2000 | Bauchot et al. | 370/348 |
| 6,487,184 | B1 * | 11/2002 | Pecen et al. | 370/329 |
| 7,522,924 | B2 * | 4/2009 | Abeta et al. | 455/452.2 |
| 2003/0191844 | A1 * | 10/2003 | Meyer et al. | 709/227 |
| 2004/0042492 | A1 * | 3/2004 | Suzuki et al. | 370/473 |
| 2004/0047343 | A1 * | 3/2004 | Muniere | 370/352 |
| 2005/0030964 | A1 * | 2/2005 | Tiedemann et al. | 370/431 |
| 2006/0034247 | A1 | 2/2006 | Gu et al. | |
| 2006/0104300 | A1 | 5/2006 | Ho | |
| 2007/0011554 | A1 | 1/2007 | Trainin et al. | |
| 2007/0277073 | A1 | 11/2007 | Zegers et al. | |
| 2009/0086685 | A1 * | 4/2009 | Aghili et al. | 370/336 |
| 2009/0129317 | A1 * | 5/2009 | Che et al. | 370/328 |

OTHER PUBLICATIONS

3GPP, Ericsson, Motorola, Nokia, Nokia Siemens Networks, Qualcomm, "Multiple ACK/NAK for TDD", 3GPP R1-081110, Sorrento, Italy, Feb. 11-15, 2008, p. 1-1.
3GPP, Ericsson, "Combination of ACK/NACKs for TDD", 3GPP R1-080870, Sorrento, Italy, Feb. 11-15, 2008, pp. 1-2.
3GPP, "3rd Generation Partnership Project; Technical Specification Group Radio Access Network; Evolved Universal Terrestrial Radio Access (E-UTRA); Physical Channels and Modulation", 3GPP TS 36.211, Release 8, V8.4.0, Valbonne, France, Sep. 2008, pp. 1-80.
3GPP, "3rd Generation Partnership Project; Technical Specification Group Radio Access Network; Evolved Universal Terrestrial Radio Access (E-UTRA); Physical layer procedures", 3GPP TS 36.213, Release 8, V8.5.0, Valbonne, France, Dec. 2008, pp. 1-74.
3GPP TSG RAN WG1 Meeting #48b, St. Julians, Malta, Mar. 26-30, 2007.

\* cited by examiner

*Primary Examiner* — Andrew Lai
(74) *Attorney, Agent, or Firm* — Ronald O. Neerings; Wade James Brady, III; Frederick J. Telecky, Jr.

(57) ABSTRACT

A transmission of information between a secondary to a primary node in a wireless network occurs in a plurality of N logical time durations. Bundled feedback information for multiple DL transmissions is provided in one UL transmission. Each DL transmission is indicated by a DL grant comprising an M-bit downlink assignment indicator (DAI) field. The primary node increments the value of the M-bit DAI field in successively transmitted DL grants. The secondary node examines the value of the M-bit DAI field in received DL grants, to determine the bundled feedback information.

23 Claims, 7 Drawing Sheets

TRANSMISSION OF BUNDLED FEEDBACK IN WIRELESS NETWORKS

CLAIM OF PRIORITY UNDER 35 U.S.C. 119(e)

The present application claims priority to and incorporates by reference U.S. Provisional Application No. 61/030,373, filed Feb. 21, 2008, entitled "DTX with ACK/NAK Bundling" The present application also claims priority to and incorporates by reference U.S. Provisional Application No. 61/031,886, filed Feb. 27, 2008, entitled "DTX with ACK/NAK Bundling." The present application also claims priority to and incorporates by reference U.S. Provisional Application No. 61/034,238 filed Mar. 6, 2008, entitled "DTX with ACK/NAK Bundling."

FIELD OF THE INVENTION

This invention generally relates to wireless cellular communication, and in particular to time division duplexing (TDD) in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile user equipments (UEs) and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. Here, ACK refers to acknowledgement (successful CRC check) and NACK refers to negative-acknowledgement (failed CRC check). The ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation" (3GPP TS 36.211, Release 8).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

In the EUTRA time division duplex (TDD) frame structure, different subframes are allocated for downlink (DL) and uplink (UL) transmissions. One property of TDD is that the number of UL and DL subframes within a radio frame can be different. In configurations where there are more DL subframes than UL subframes, multiple DL subframes are associated with one single UL subframe for the transmission of the corresponding control signals. For example, for each dynamically scheduled transmission in the DL subframes, ACK/NAK bits need to be transmitted in an associated UL subframe to support proper hybrid ARQ (HARQ) operation. If a UE is scheduled in multiple DL subframes which are all associated with one single UL subframe, then the UE needs to transmit multiple ACK/NAK bits in that UL subframe. One solution to reduce the number of ACK/NAK bits the UE needs to transmit is to adopt ACK/NAK bundling. Typically, the UE compresses the multiple ACK/NAK bits into one or two bundled ACK/NAK bits, which are transmitted in the corresponding UL subframe. A common ACK/NAK compression or bundling rule is that if all ACK/NAK bits are of value (ACK), then one (ACK) bit is transmitted in the UL subframe to acknowledge all received packets in the multiple DL subframes. If there is at least one NAK bit, then one (NAK) bit is transmitted in the UL subframe to request retransmission of all DL packets. The general operations of the TDD channels are described in the EUTRA specifications, for example: "3rd Generation Partnership Project; Technical Specification Group Radio Access Network; Evolved Universal Terrestrial Radio Access (E-UTRA); Physical layer procedures" (3GPP TS 36.213, Release 8).

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

In the EUTRA time division duplex (TDD) frame structure, different subframes are allocated for downlink (DL) and uplink (UL) transmissions. One property of TDD is that the number of UL and DL subframes can be different, as mentioned above. In configurations where there are more DL subframes than UL subframes, multiple DL subframes are associated with one single UL subframe for the transmission of the corresponding control signals. For example, for each dynamically scheduled transmission in the DL subframes, ACK/NAK bits need to be transmitted in an associated UL subframe to support proper hybrid ARQ (HARQ) operation. If a UE is scheduled in multiple DL subframes which are all associated with one single UL subframe, then the UE needs to transmit multiple ACK/NAK bits in that UL subframe. One solution to reduce the number of ACK/NAK bits the UE needs to transmit is to adopt ACK/NAK bundling. Typically, the UE compresses the multiple ACK/NAK bits into one or two ACK/NAK bits, which are transmitted in the corresponding UL subframe. A common ACK/NAK compression or bundling rule is that if all ACK/NAK bits are of value (ACK), then one (ACK) bit is transmitted in the UL subframe to acknowledge all received packets in the multiple DL subframes. If there is at least one NAK bit, then one (NAK) bit is transmitted in the UL subframe to request retransmission of all DL packets. In order to tell if a DL subframe has been missed, at least one bit is introduced in each DL grant that toggles each time a UE is scheduled with DL transmission. Details on the use of toggle bit(s) and other detection schemes for missed DL grant will be described in more detail below.

Figure 1:
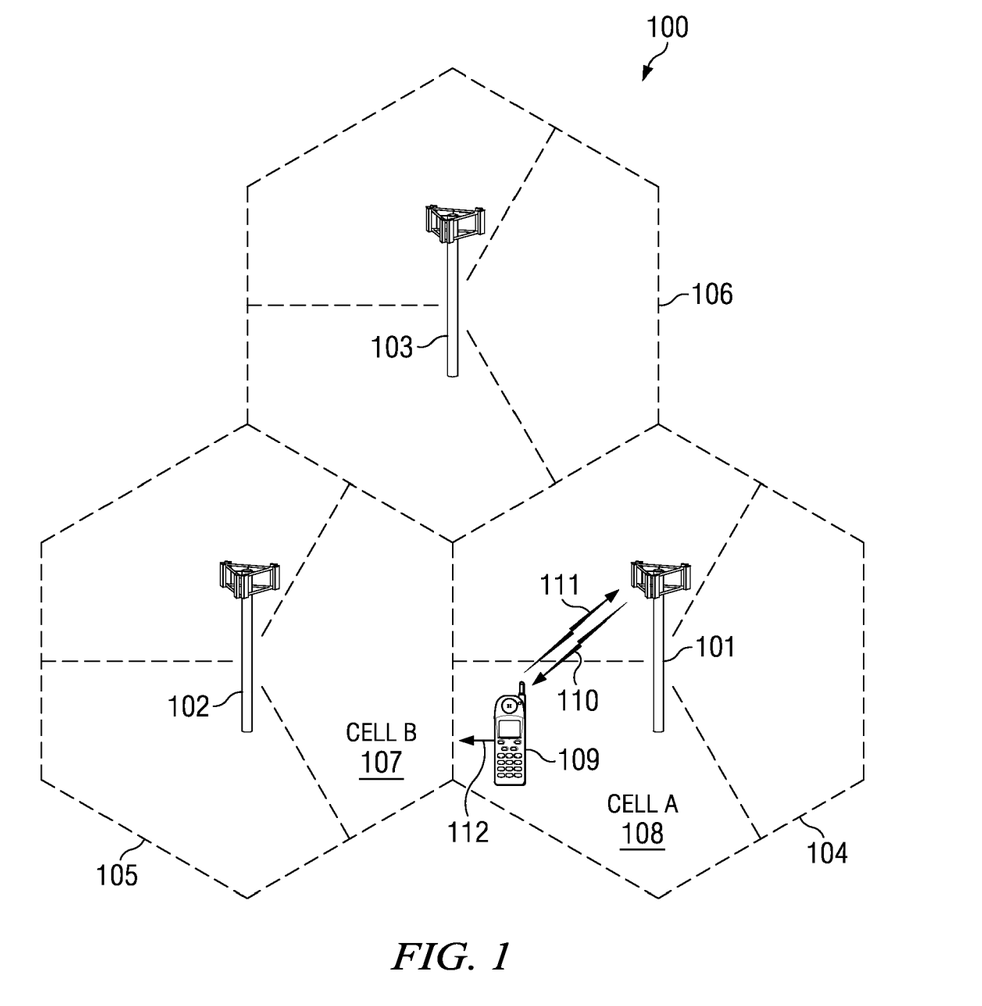
FIG. 1 is a pictorial of an illustrative telecommunications network that employs an embodiment of the bundled feedback transmission scheme.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

In one embodiment, UE 109 is transmitting to and receiving transmissions from base station 101 using TDD frame structures. As mentioned above, in TDD both the UL 111 and the DL 110 are accommodated on the same transmission channel. In order for a UE to tell if a DL grant is missed in a DL subframe, an M-bit field is included in each DL grant. In general, the M-bit field is named as downlink assignment indicator (DAI). DAI is used by the UE to determine how many DL grants it should receive, as will be explained in more detail below.

Figure 2:
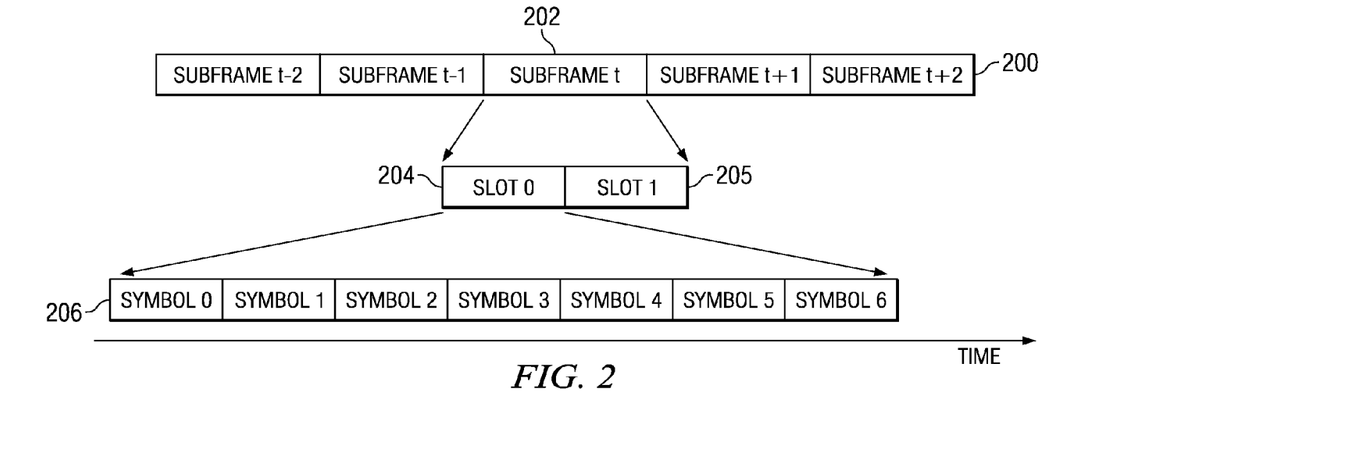
FIG. 2 illustrates a subframe structure used in the network of FIG. 1.

FIG. 2 is an example frame structure 200 used in FIG. 1. Each frame 200 contains several subframes, as indicated generally at 202. In turn, subframe 202 contains two slots 204, 205. Each slot contains a number of information carrying symbols, generally indicated at 206. A cyclic prefix (CP) field is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2.

For PUCCH, a cyclically shifted or phrase ramped CAZAC-like sequence is transmitted in each symbol. Different cyclic shifts or different amounts of phrase ramping can be used to multiplex more than one UE's PUCCH transmission in the same physical resource block. A resource block in 3GPP E-UTRA is defined as twelve consecutive resource elements in frequency domain, wherein each resource element is of 15 kHz. Ideally, feedback transmission on all twelve cyclic shifts can be supported within one RB. However, due to spillover between consecutive cyclic shifts, it is recommended that not all 12 cyclic shifts are utilized.

For ACK/NAK transmission, additional orthogonal covering can be applied across the symbols in the time domain, thereby increasing the ACK/NAK multiplexing up to 36 ACK/NAK channels per PUCCH resource block. However, due to spillover between consecutive cyclic shifts, it is recommended that not all twelve cyclic shifts are utilized. In a typical embodiment, only eighteen ACK/NAK channels are used.

In each OFDM symbol, a cyclically shifted or phase ramped CAZAC-like sequence is transmitted. The CAZAC-like sequence in an RS OFDM symbol is typically un-modulated. The CAZAC-like sequence in a data OFDM symbol is modulated by the data symbol. Here the data symbol can be the ACK/NAK symbol, SRI symbol, Rank Indicator (RI) symbol, precoding matrix indicator (PMI) or channel quality indicator (CQI) symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff—Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, 0 \leq n \leq M_{sc}^{RS} - 1$$

where $M_{sc}^{RS} = 12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

Definition of $\phi(n)$

| u | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -1 | 3 | -3 | 1 | -3 | 3 | 3 |
| 23 | 1 | 1 | -1 | -3 | -1 | 3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Figure 3A:
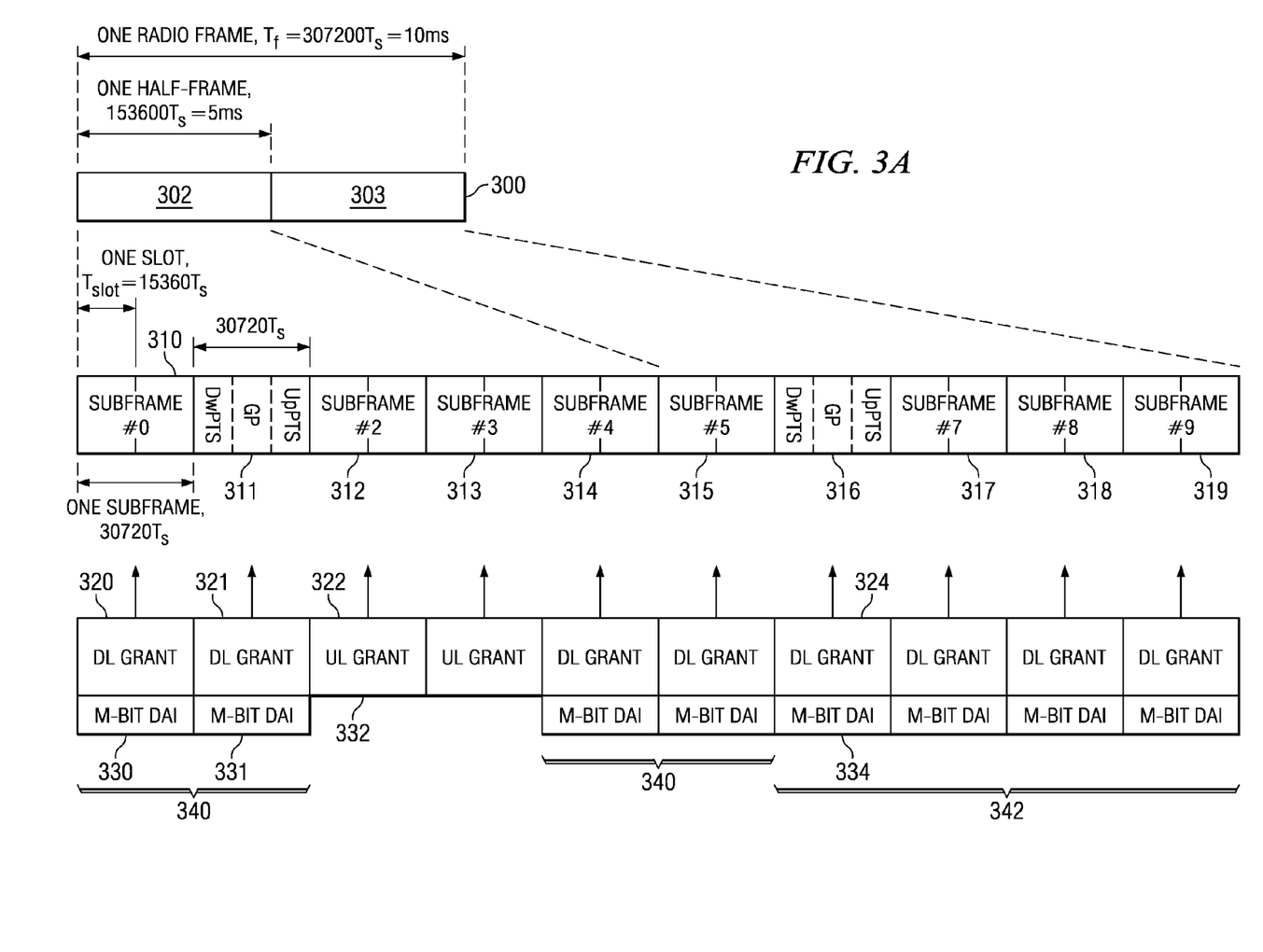
FIG. 3A is an illustration of an EUTRA TDD frame structure that includes a downlink assignment indicator field in each DL grant for indicating the number of DL subframes scheduled for a UE.

FIG. 3A is an illustration of an EUTRA TDD frame structure 300. Half-frame 302 and 303 together form a complete radio frame 300 that spans 10 ms. Each radio frame is defined to be of a length T equal to 307,200 samples $T_S$. Each half-frame is therefore 153,600 $T_S$ which is equal to 5 ms. As discussed with regard to FIG. 2, each frame includes a number of subframes, indicated generally at 310, which are each 30720 $T_S$ and have a 1 ms duration.

Within a TDD frame, the second subframe is defined to be a special subframe 311 that includes a downlink pilot time slot (DwPTS), a guard period (GP) and an uplink pilot time slot (UpPTS). Depending on the switch-point periodicity, there may be a second special subframe located in subframe 316. For scheduling purposes, the DwPTS in the special subframe can be used as a DL subframe for DL data transmission.

Different subframes are allocated for downlink (DL) or uplink (UL) transmissions. Table 2 shows an example of applicable DL/UL subframe allocations. Another embodiment may use a different set of allocations.

TABLE 2

Uplink-downlink allocations

| Con-figuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Each subframe 310-319 of each radio frame may contain a corresponding DL or UL grant that is transmitted on the physical downlink control channel (PDCCH). Typically, a DL or UL grant to a particular UE is only transmitted by the UE's serving NodeB when the serving NodeB has scheduled a corresponding resource block for use in DL or UL by the UE. For example, DL grant 320 for a UE indicates that the UE is scheduled for a DL transmission in subframe 310. UL grant 332 for a UE indicates that the UE is scheduled for an UL transmission in subframe 312. Similarly, DL grant 324 indicates subframe 314 is scheduled for a UE's DL transmission, and so on. Each DL grant includes an M-bit DAI field, as described in detail below.

As mentioned earlier, one property of TDD is that the number of UL and DL subframes within a radio frame can be different. In the configurations where there are more DL subframes than UL subframes, multiple DL subframes are associated with one single UL subframe for the transmission of the corresponding control signal(s). For example, for each dynamically scheduled transmission in the DL subframes, ACK/NAK bits need to be transmitted in an associated UL subframe to support proper hybrid ARQ (HARQ) operation. If a UE is scheduled in multiple of DL subframes which are all associated with one single UL subframe, the UE needs to transmit multiple ACK/NAK bits in that UL subframe. One solution to reduce the number of ACK/NAK bits the UE needs to transmit is to adopt ACK/NAK bundling. Typically, the UE compresses the multiple ACK/NAK bits into 1 or 2 ACK/NAK bits that are transmitted in the corresponding UL subframe.

Figure 3B:
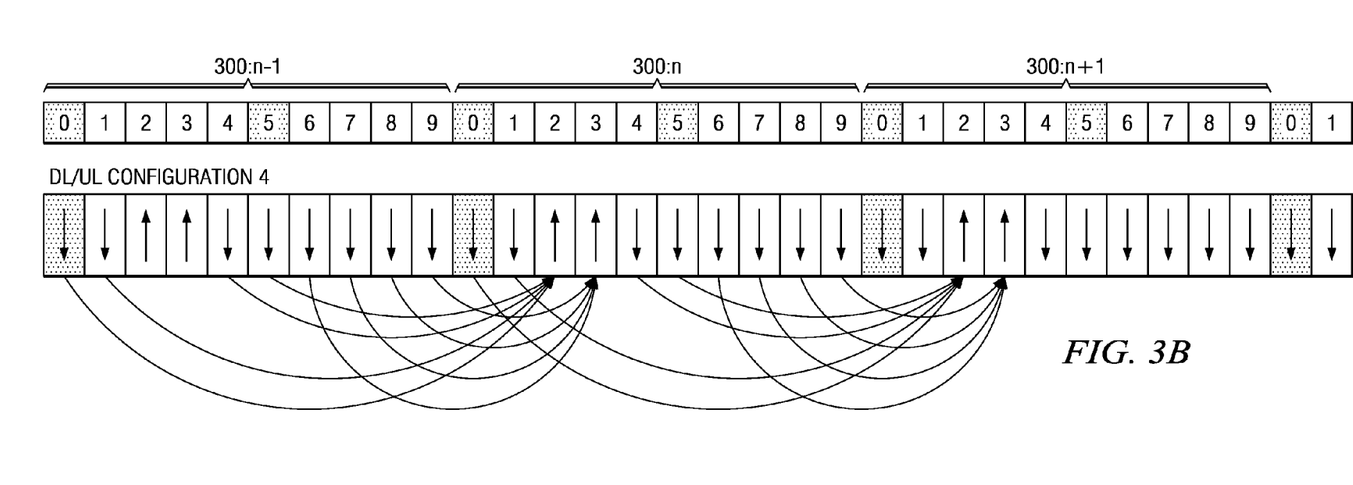
FIG. 3B is an illustration of uplink ACK/NAK bundling for one configuration of the TDD frame structure of FIG. 3A.

FIG. 3B is an illustration of uplink ACK/NAK bundling for one configuration of the TDD frame structure of FIG. 3A. This example illustrates bundling for configuration 4 of Table 2. Notice that in uplink subframe 2 of radio frame 300:n a bundled ACK/NAK is reported for the subframes 0, 1, 4 and 5 of frame 300:n−1; and in subframe 3 a bundled ACK/NAK is reported for subframe 6, 7, 8, and 9 of frame 300:n−1.

Other embodiments may use different bundle mappings than those illustrated in FIG. 3B. Typically, a configuration will be fixed within a cell. In practice, the UL/DL subframe configuration is fixed for the entire network, although this is not required.

Overall, for DL transmission, UE operation is that UE detects DL grant in DL subframe n and UE transmits the corresponding ACK/NAK in UL subframe n+k with k>3, as illustrated in FIG. 3B for configuration 2.

Figure 4:
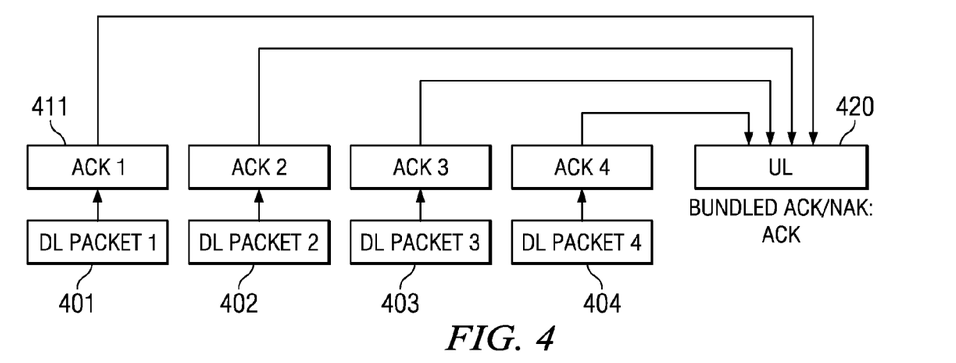
FIG. 4 illustrates a sequence of DL subframes with a bundled ACK response in an uplink subframe.

A common ACK/NAK compression or bundling rule is that if all ACK/NAK bits are of value (ACK), then one (ACK) bit is transmitted in the UL subframe to acknowledge all received packets in the multiple DL subframes, as shown in FIG. 4. In this example, four DL packets 401-404 are received. Each DL packet is received in one DL subframe. Example of the four DL subframes can be subframes {0, 1, 4, 5} of frame 300:n−1 in FIG. 3B. Another example of the four DL subframes can be subframes {6, 7, 8, 9} of frame 300:n−1 in FIG. 3B. The UE performs error checking using an included CRC field and determines if the packet was received correctly. If so, it indicates an acknowledgement by ACK bit 411 for DL packet 401. In this example, all four DL packets where received correctly as indicated by the four respective ACK bits. A single bundled ACK bit is then reported on UL subframe 420 that is associated with this set of four DL packets. Note that it is possible that a UE is only scheduled in a subset of the four DL subframes, in which case, ACK/NAK bundling is performed across the ACK/NAK of each received DL packets.

Figure 5:
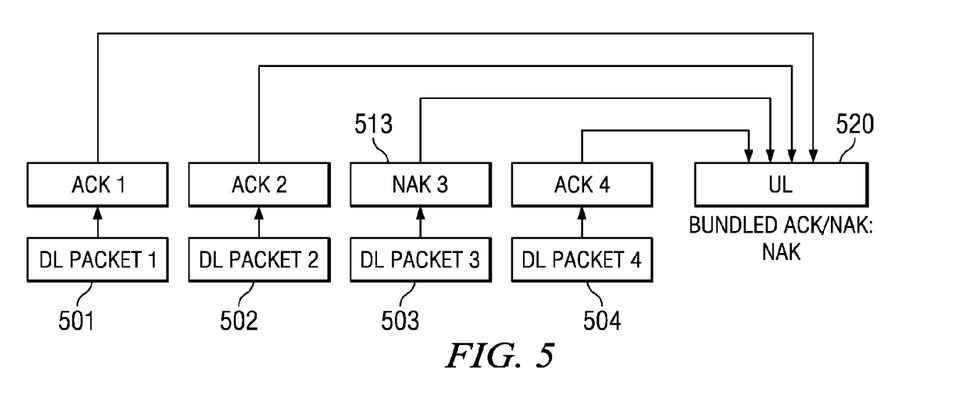
FIG. 5 illustrates a sequence of DL subframes with a bundled NAK response in an uplink subframe.

If there is at least one NAK bit, then one (NAK) bit is transmitted in the UL subframes to request retransmission of all DL packets, as shown in FIG. 5. In this example, DL packet 503 was not received correctly, as indicated by NAK bit 513. A NAK is transmitted as the bundled response in UL 520 associated with DL packets 501-504.

Figure 6:
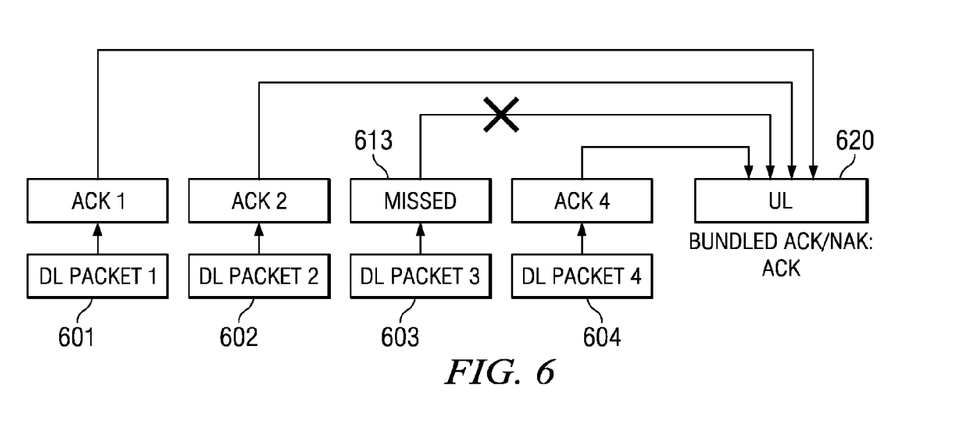
FIG. 6 illustrates a sequence of DL subframes with a bundled ACK response in an uplink subframe in which an error case is present.

FIG. 6 illustrates a sequence of DL subframes with a bundled ACK response in an uplink subframe in which a missed DL grant is present. In this example, DL packet-3 603 is missed by the UE, due to the UE's missing detection of the associated DL grant. In other words, the UE does not know that it has DL packet 3 to receive and therefore an ACKNAK response 613 is missing. In case the rest of the DL packets 601, 602, 604 for this UE are all correctly received, the UE will bundle all (ACK)s, i.e. three (ACK)s, in to a single (ACK) bit, which is transmitted in the associated UL subframe 620. The NodeB or receiver decodes the bundled ACK bit, and will not retransmit DL packet 3. Therefore, it directly leads to packet loss in the physical layer.

A method which enables the UE to explicitly determine if any DL grant is missed will now be described in detail below. In case a UE detects that it has missed one or more DL grants, it can signal a discontinuous transmission (DTX) as the bundled ACK/NAK feedback in the UL subframe. A DTX means that UE will not transmit any signal. Referring again to FIG. 3A, each DL grant includes an M-bit downlink assignment indicator (DAI) field. For example, DL grant 320 includes an M-bit DAI field 330, while the next DL grant 321 includes M-bit DAI field 321. The M-bit fields included in each DL grant can be used to determine if all DL grants of a particular grant set (or a particular DL subframe set associated with a common UL subframe), such as DL grant set 340, have been received. Similarly, each of the DL grants in DL grant set 342 contain an M-bit DAI field, such as 334 in DL grant 324.

Without loss of generality, assume there are N DL subframes associated with a common UL subframe in which the bundled ACK/NAK bits associated with the N DL subframes are transmitted. Assume the value of the M-bit DAI field is set to a default value, such as "1", in the first DL grant scheduled within the N DL subframes. The value of the M-bit DAI field for a particular UE is incremented by the NodeB each time the UE is scheduled to receive a DL transmission. Thus, the value of the M-bit DAI field in each DL grant represents a count value for the number of DL grants to a particular UE, up to the current DL subframe. It is also not precluded that the count value can be reset to its default value after a certain period or a number of subframes. For example, the count value can be reset to its default value at the beginning of each system/radio frame or half-frame. Alternatively, the M-bit count value can be reset to its default value in the first of N DL subframes that are associated with a common UL subframe.

If the number of received DL grants is the same as the count value, then the UE may infer that it did not miss any DL grants. Otherwise, the UE infers that it missed at least one DL grant. Therefore, the UE can transmit "NAK" as the bundled ACK/NAK bit when it infers that it has missed one or more DL grants. Alternatively, the UE can transmit ACK/NAK DTX when it infers one or more DL grants were missed.

Referring again to Table 2, N may have a value of 1, 2, 3, 4 or 9. Thus, it would take at least three bits to represent all five values. In order to reduce the number of bits required for the M-bit DAI field in the DL grant, such as M-bit DAI field 330, a modulo operation may be used to represent the value of N. For example, if M=2, then the values of 1, 2, 3, and 4 can be represented by the 2-bit DAI field. These four values may indicate 1-9 DL grants, by allowing a value of 1 to indicate 1, 5 or 9 DL grants, a value of 2 to indicate 2 or 6 DL grants, a value of 3 to indicate 3 or 7 DL grants and a value of 4 to indicate 4 or 8 DL grants, for example. Of course, other encodings could be used.

Figure 7:
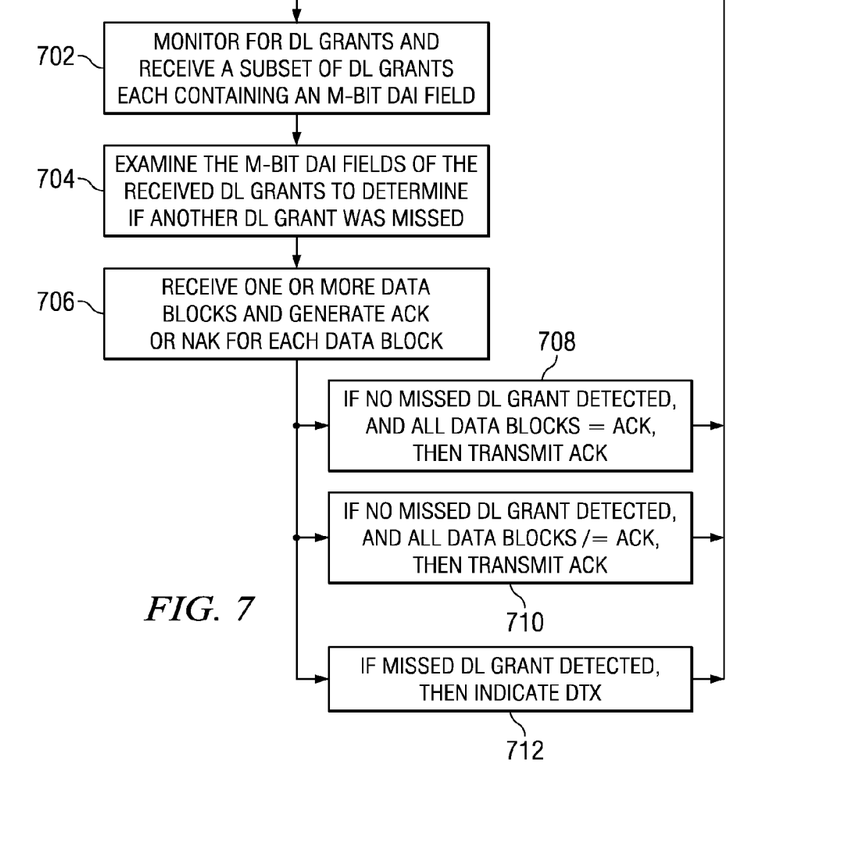
FIG. 7 is a flow diagram illustrating detection of missed DL grants according to an embodiment of the present invention.

FIG. 7 is a flow diagram illustrating detection of missed DL grant according to an embodiment of the present invention. A UE monitors 702 for downlink grants in a set of downlink subframes indexed by {1, 2, . . . , N}, wherein at most one downlink grant is assigned in one downlink subframe. N is the number of DL subframes associated with a single UL subframe. The bundled ACK/NAK corresponding to the N DL subframes is transmitted in the same UL subframe. The N DL subframes are not necessarily consecutive. For LTE TDD, N can be 1, 2, 3, 4, or 9, as illustrated in Table 2.

Within the set of N DL subframes, the UE receives 702 downlink grant(s) in a subset of T downlink subframes, increasingly indexed by {S(1), S(2), . . . , S(T)}, wherein $1 \leq T \leq N$. In other words, T is the number of subframes within which UE detects DL grants.

The UE examines 704 the M-bit DAI fields of the received DL grants to determine if another DL grant in the set of N DL subframes was missed. Basically, the UE determines that a DL grant was missed if the value of the M-bit DAI field of the first received DL grant does not correspond to a default count value. In addition, as each DL grant is received, if the value of the M-bit DAI field in the successive DL grant is not incremented by one with respect to the last received DL grant, the UE may conclude that a DL grant was missed. In addition, in case the maximum value of the M-bit DAI field is less than N, then the UE may conclude that a DL grant was missed, if the value of the M-bit DAI field in the successive DL grant is not incremented by one with respect to the last received DL grant, modulo the maximum value of the M-bit field. In this embodiment, M is two, but in other embodiments M may be greater than two.

As the NodeB prepares the DL grants for transmission to the UE, the M-bit DAI field is generated in a modular manner modulo the maximum value of the M-bit DAI field by incrementing the value placed in each successive M-bit DAI field.

The M-bit DAI field in the first scheduled DL grant shall correspond to a default value, e.g. "1". Each time a UE is scheduled with a DL grant, NodeB increments the value of the M-bit DAI field by 1. If the value of the M-bit DAI field reaches the maximum value, then it wraps around in the next scheduled DL grant.

The UE receives 706 at least one block of data transmitted using a set of resource blocks in subframe S(n) indicated by the n-th received downlink grant, and generates 706 an acknowledgement $A_n$ for the received block of data in subframe S(n) that is either a positive ACK if the CRC is correct or a negative NAK if the CRC is incorrect.

The UE derives a value $C_{S(T)}$ that is the value of the M-bit DAI field in the last received downlink grant in the subframe indexed by S(T), and derives an uplink control channel (e.g. ACK/NAK channel) indexed by I. Each DL grant is transmitted on a physical downlink control channel (PUCCH). Each PDCCH comprises a set of control channel elements (CCEs). Each control channel elements comprises a set of resource elements (REs). Each CCE is associated with an ACK/NAK channel in the UL subframe. In an embodiment, the UE transmits the bundled ACK/NAK bit(s) in the ACK/NAK channel associated with the lowest CCE in the last received DL grant. In this manner, the NodeB may infer which is the last DL grant received by the UE, based on the ACK/NAK channel used by the UE to feedback the bundled ACK/NAK bit. In another embodiment, there could be multiple ACK/NAK channels associated with a DL grant, in which case the NodeB and UE shall reach an agreement on which ACK/NAK channel to use, e.g. by following some pre-determined rule.

The UE provides a bundled feedback for the set of received DL packets in an uplink subframe corresponding to the set of DL subframes. In a first case, block 708 transmits a positive acknowledge (ACK) using the uplink control channel I, if $C_{S(T)}=(T-1) \bmod 2^M+1$ and $A_1, A_2, \ldots, A_T$ are all positive acknowledgements. Note that $C_{S(T)}=(T-1) \bmod 2^M+1$ indicates that UE does not detect any missed DL grant, wherein the default value of the M-bit DAI field is 1.

In a second case, in block 710 the UE transmits a negative acknowledge (NAK) using the uplink channel I, if $C_{S(T)}=(T-1) \bmod 2^M+1$ and at least one of $A_1, A_2, \ldots, A_T$ is a negative acknowledgement. Note that $C_{S(T)}=(T-1) \bmod 2^M+1$ indicates that UE does not detect any missed DL grant, wherein the default value of the M-bit DAI field is 1.

In a third case, in block 712 the UE transmits on the control channel I, if $C_{S(T)} \neq (T-1) \bmod 2^M+1$, which is interpreted by the NodeB as an indication of DTX. Note that $C_{S(T)} \neq (T-1) \bmod 2^M+1$ indicates that UE detects at least one missed DL grant, wherein the default value of the M-bit DAI field is 1. In another embodiment, UE transmits a NAK as the bundled feedback on control channel I if it detects that at least one DL grant is missed.

Toggle Bit Embodiment

In another embodiment, the M-bit DAI field may be a single-bit field that toggles each time a UE is scheduled with (DL) transmission. FIGS. 8-11 illustrate a sequence of DL subframes with a bundled ACK/NAK response in an uplink subframe, in which the DAI field in the DL grant is a toggle bit. In this embodiment, the M-bit field 330 in FIG. 3A is a single bit field.

Without loss of generality, denote the M-bit field in this embodiment as "TogBit". In the following, the usage of the "TogBit" is described assuming it consists of 1 bit. It is easy to extend to the case where "TogBit" consists of multiple bits.

Figure 8:
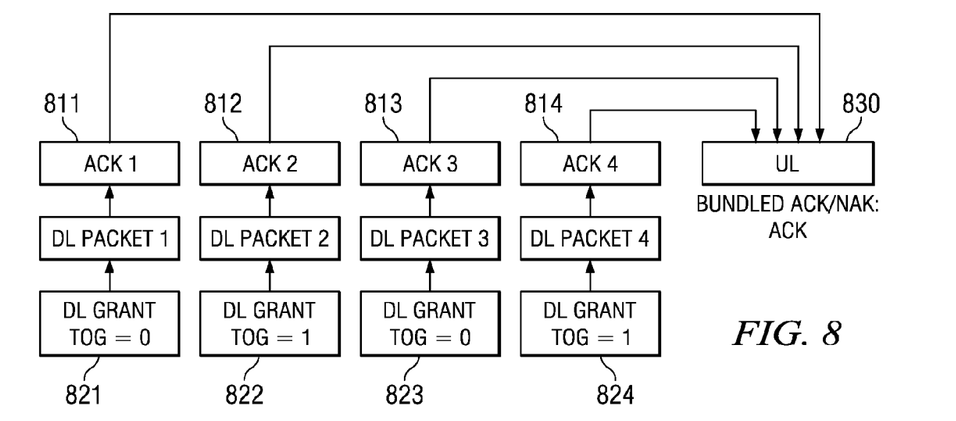
FIGS. 8-11 illustrate a sequence of DL subframes with a bundled ACK response in an uplink subframe, in which the downlink assignment indicator field in the DL grant is a toggle bit.

Referring to FIG. 8, the "TogBit" can be part of the UE's DL grant, as illustrated at 821-824. Whenever a UE is scheduled for the first time within a time frame region where ACK/NAK bundling is needed, the "TogBit" has a default value, e.g. "0", as shown in DL grant 821. Afterward, each time the same UE is scheduled to receive DL transmission, the "TogBit" in its DL grant flips value, as shown in DL grants 822 and 824. The "TogBit" can help UE to detect missed DL packets, which in turn helps the UE decide the proper ACK/NAK bundling behavior, similar to the scheme described above with reference to FIG. 7. In this example, all four acknowledgments 811-814 generated based on the received DL packets are ACK. Therefore ACK is transmitted in UL subframe 830.

Figure 9:
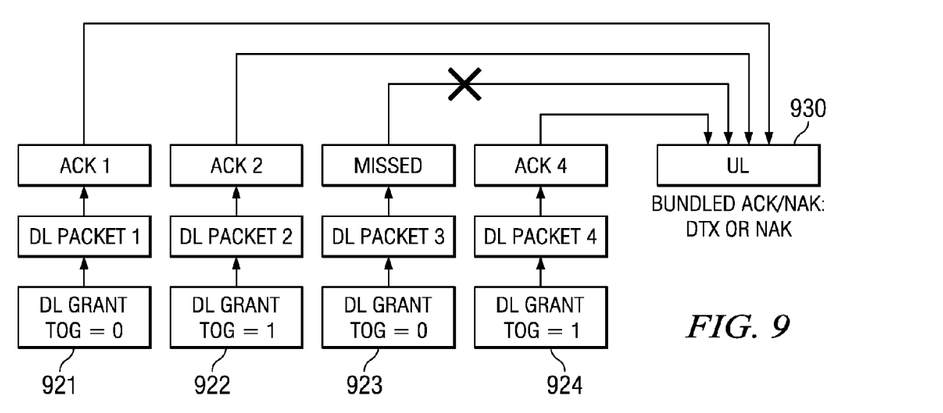

FIG. 9 shows an example where a UE misses its DL packets 3 due to miss detection of DL grant 923. By observing the "TogBit" in the detected DL grants 921, 922 and 924, the UE checks if the "TogBit" toggles in successively detected DL grants. In this example, UE observes that "TogBit" remains "1" on DL grant 924 from the earlier detected "TogBit" from DL grant 922. Therefore, UE can immediately infer that at least one of its DL packets is missed. With that knowledge, UE can set the bundled ACK/NAK bits to "NAK" in UL subframe 930. Alternatively, UE can choose not to transmit any ACK/NAK bit in UL subframe 930, which corresponds to ACK/NAK DTX. In response, the NodeB needs to perform ACK/NAK DTX detection.

In case a UE detects its first received DL grant with "TogBit" other than the default "TogBit" value, then UE can infer that at least one of its earlier packets is missed. Consequently, UE can transmit a (NAK) or (DTX) as its bundled ACK/NAK bit(s) in the corresponding UL subframe.

Figure 10:
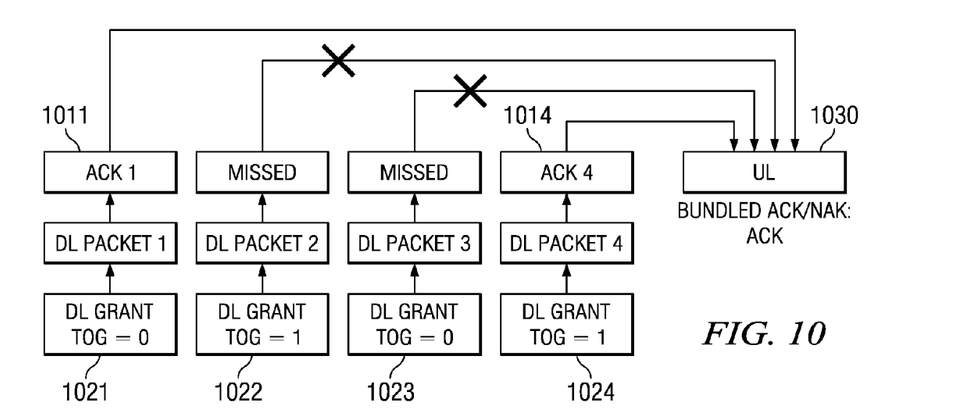

In case a UE misses two DL grants, such as 1022, 1023, as shown in FIG. 10, it cannot detect missed DL grants according to using a 1-bit "TogBit", since the TogBit of DL grant 1024 toggles from DL grant 1021. In this case, the UE will report an ACK on UL subframe 1030 based on positive acknowledgements 1011 and 1014. On the other hand, missing two DL grants within the ACK/NAK bundle time frame region is of much smaller probability. In case this error case happens, higher layer ARQ is needed to recover lost packets by retransmissions. Note that increasing the number of bits in the M-bit DAI field, or the "TogBit", can reduce the occurrence of this error case.

Figure 11:
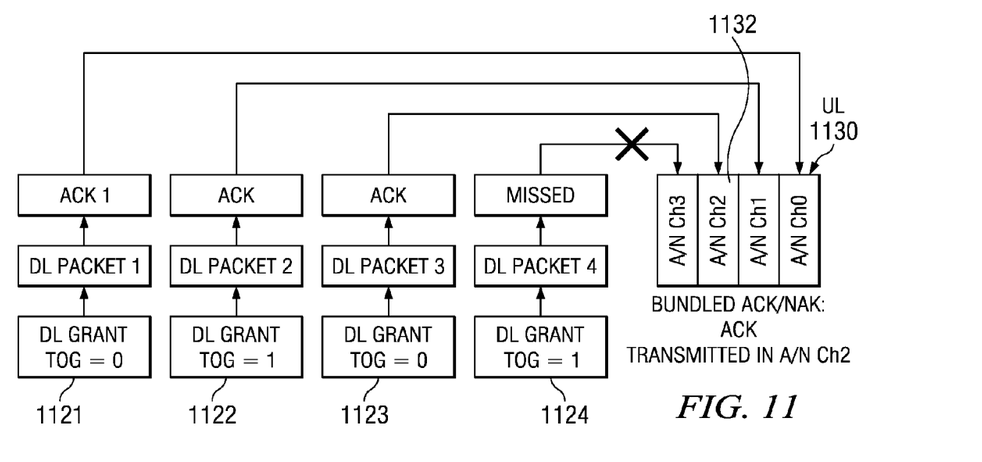

In the UL subframe, there are one or more ACK/NAK channels for each of the DL subframes. FIG. 11 shows that UE transmits the bundled ACK/NAK bit(s) in the ACK/NAK channel in the corresponding UL subframe 1130 associated with the last DL subframe in which the UE received a packet or detected a DL grant.

In an embodiment in which a set or multiple ACK/NAK channels in the UL subframe are available for each DL subframe, the UE transmits the bundled ACK/NAK bit(s) in the ACK/NAK channel that corresponds to the lowest CCE index of the last detected DL grant. In other words, it is possible for a UE to have multiple UL ACK/NAK channels associated with the last detected DL grant, e.g. implicitly derived from the multiple CCEs in the last detected DL grant. In this case, UE can transmit the bundled ACK/NAK bit in the UL ACK/NAK channel associated with the lowest CCE index in the last detected DL grant. In this manner, the NodeB can infer the last DL grant received by the UE based on the ACK/NAK channel used by the UE to feedback the bundled ACK/NAK bit.

Referring still to FIG. 11, in which DL grant 1124 is missed, therefore the third DL grant 1123 is the last DL grant received. Since A/N ch2 1132 of the set A/N Ch0-A/N Ch3 corresponds to the DL grant 1123, the ACK acknowledgement is reported on the ACK/NAK channel 1132. In this manner, the NodeB can determine that the fourth DL grant 1124 was missed by the UE since the ACK acknowledgement was provided in the ACK/NAK channel corresponding to DL grant 1123.

The described method applies to any systems where ACK/NAK bundling is implemented, including but not limited to TDD, FDD, and HD-FDD systems. Although DL transmission is used in describing the embodiments of this invention, it is not precluded to apply the invention in UL transmission.

It is not precluded that the "TogBit" can be extended to be more than one bit. In general, assuming an M-bit "TogBit", the value of the "TogBit" (for a certain UE) can be increased by one each time the UE is scheduled for a transmission. It is also not precluded that the "TogBit" value can be reset to its default value after a certain period or a number of subframes. For example, the "TogBit" value can be reset to its default value at the beginning of each system/radio frame or half-frame. Alternatively, the M-bit "TogBit" value can be reset to its default value in the first of N DL subframes, which are associated with a common UL subframe.

Note that the "TogBit" can be UE-specific, as described in this document.

An Embodiment in which M-Bit Field Indicates Total Count

Another embodiment that enables the UE to explicitly determine and signal DTX when ACK/NAK bundling is used will now be described in more detail. Referring again to FIG. 3A, each DL grant includes one or more bits as an M-bit DAI field. For example, DL grant 320 includes an M-bit DAI field 330, while the next DL grant 321 includes M-bit DAI field 321. The M-bit fields included in each DL grant can be used to determine if all DL grants of a particular grant set, such as DL grant set 340, have been received. Similarly, each of the DL grants in DL grant set 342 contain an M-bit DAI field, such as 334 in DL grant 324.

Without loss of generality, assume there are N DL subframes associated with a common UL subframe in which the bundled ACK/NAK bits associated with the N DL subframes are transmitted. A NodeB may perform multi-subframe scheduling in the N DL subframes. In this way, the NodeB knows how many DL grants each scheduled UE is supposed to get. Denote m[k] as the number of DL grants a UE k should receive, or the number of DL subframes a UE k is scheduled for transmission, within the set of N DL subframes. The NodeB can explicitly include the information of m[k] in each DL grant for UE k. In the N DL subframes of interest, as long as UE k detects at least one DL grant, it knows how many subframes it is scheduled to receive data within the N DL subframes. Therefore, UE k can compare the number of received DL grants and the value of m[k] in the received DL grants. If the number of received DL grants is the same as m[k], then the UE may infer that it did not miss any DL grants. Otherwise, the UE infers that it missed at least one DL grant. Therefore, the UE can transmit "NAK" as the bundled ACK/NAK bit when it infers that it has missed one or more DL grants. Alternatively, the UE can transmit ACK/NAK DTX when it infers one or more DL grants were missed.

Referring again to Table 2, N may have a value of 1, 2, 3, 4 or 9. Thus, it would take at least three bits to represent all five values. In order to reduce the number of bits required for the M-bit DAI field in the DL grant, such as M-bit field 330, a modulo value may be used to represent the number of scheduled DL grants. For example, if M=2, then the values of 1, 2, 3, and 4 are available. These four values may indicate 1-9 DL grants, by allowing a value of 1 to indicate 1, 5 or 9 DL grants, a value of 2 to indicate 2 or 6 DL grants, a value of 3 to indicate 3 or 7 DL grants and a value of 4 to indicate 4 or 8 DL grants, for example. Of course, other encodings could be used.

System Example

Figure 12:
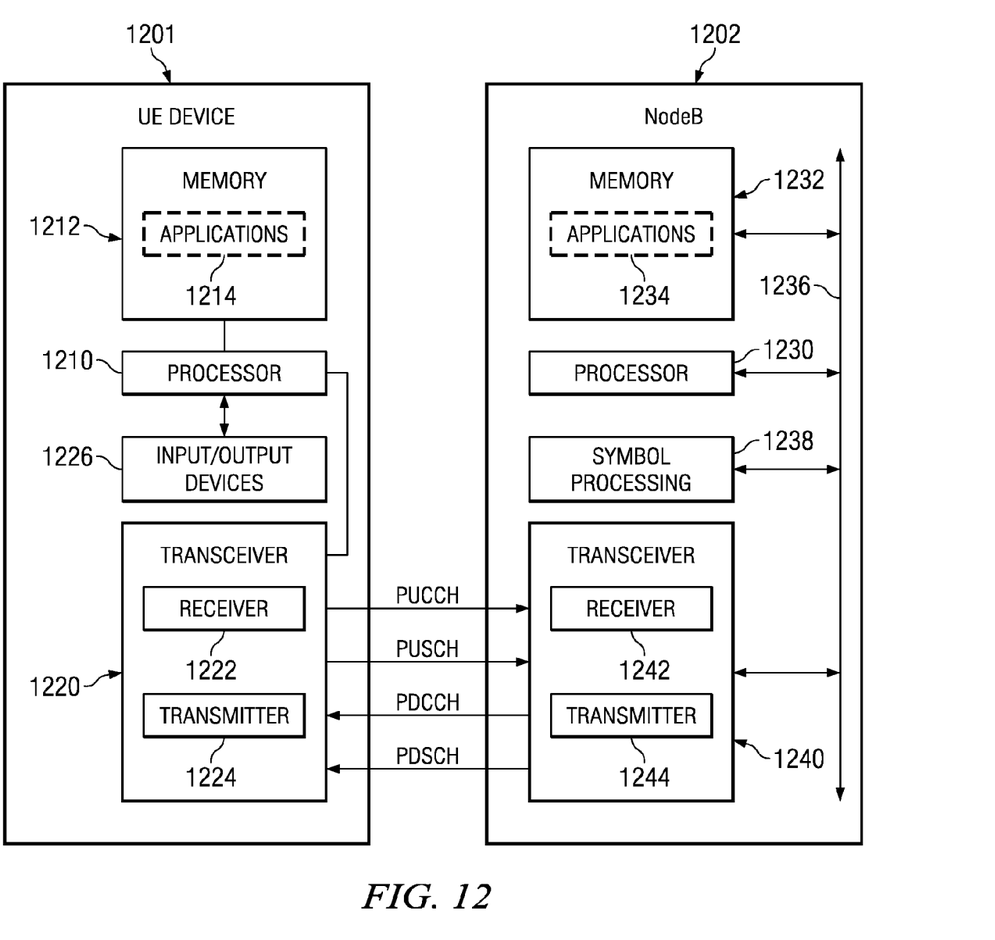
FIG. 12 is a block diagram of a Node B and a User Equipment for use in the network system of FIG. 1.

FIG. 12 is a block diagram illustrating operation of a NodeB 1202 and a mobile UE 1201 in the network system of FIG. 1. The mobile UE device 1201 may represent any of a variety of devices such as a server, a desktop computer, a laptop computer, a cellular phone, a Personal Digital Assistant (PDA), a smart phone or other electronic devices. In some embodiments, the electronic mobile UE device 1201 communicates with the NodeB 1202 based on a LTE or E-UTRAN protocol. Alternatively, another communication protocol now known or later developed can be used.

As shown, the mobile UE device 1201 comprises a processor 1210 coupled to a memory 1212 and a Transceiver 1220. The memory 1212 stores (software) applications 1214 for execution by the processor 1210. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 1201 to transmit UL signals to the NodeB (base-station) 1202 periodically or continuously via the transceiver 1220. In at least some embodiments, the mobile UE device 1201 identifies a Quality of Service (QoS) requirement when requesting an uplink resource from the NodeB 1202. In some cases, the QoS requirement may be implicitly derived by the NodeB 1202 from the type of traffic supported by the mobile UE device 1201. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1220 includes uplink logic which may be implemented by execution of instructions that control the operation of the transceiver. Some of these instructions may be stored in memory 1212 and executed when needed by processor 1210. As would be understood by one of skill in the art, the components of the Uplink Logic may involve the physical (PHY) layer and/or the Media Access Control (MAC) layer of the transceiver 1220. Transceiver 1220 includes one or more receivers 1222 and one or more transmitters 1224.

Processor 1210 may send or receive data to various input/output devices 1226. A subscriber identity module (SIM) card stores and retrieves information used for making calls via the cellular system. A Bluetooth baseband unit may be provided for wireless connection to a microphone and headset for sending and receiving voice data. Processor 1210 may send information to a display unit for interaction with a user of the mobile UE during a call process. The display may also display pictures received from the network, from a local camera, or from other sources such as a USB connector. Processor 1210 may also send a video stream to the display that is received from various sources such as the cellular network via RF transceiver 1222 or the camera.

During transmission and reception of voice data or other application data, transmitter 1224 sends ACKNAK information via the PUCCH link to the serving NodeB 1202, as described in more detail above. A bundled ACK/NAK is transmitted on a UL subframe in PUCCH in correspondence to a set of DL packets. As described in more detail above for TDD, different subframes are allocated for downlink (DL) or uplink (UL) transmissions. In order for the UE to determine if it has missed a DL grant, an M-bit DAI field is included in each DL grant. In one embodiment, this field may contain a multi-bit field that is incremented for each DL grant, as discussed in more detail with respect to FIGS. 3-7. In another embodiment, this field may be a one-bit field in which a toggle bit is used by the UE to infer if a DL grant has been missed, as described above in more detail with regard to FIGS. 8-11. In another embodiment, the field may be a modulo value indicative of how many DL grants a UE should receive, as described in more detail above. In one embodiment, the DL grant detection scheme is embodied by executing instructions stored in memory 1212 by processor 1210. In other embodiments, the DL grant detection scheme may be embodied by a separate processor/memory unit, by a hard-wired state machine, or by other types of control logic, for example.

The bundled ACKNAK is then transmitted by transmitter 1224 on the associated uplink subframe. In the case where multiple ACKNAK channels are allocated to the UE as described in more detail with regard to FIG. 11, the bundled ACKNAK may be transmitted on a channel selected according to the last received DL grant, for example.

NodeB 1202 comprises a Processor 1230 coupled to a memory 1232, symbol processing circuitry 1238, and a transceiver 1240 via backplane bus 1236. The memory stores applications 1234 for execution by processor 1230. The applications could comprise any known or future application useful for managing wireless communications. At least some of the applications 1234 may direct the base-station to manage transmissions to or from the user device 1201.

Transceiver 1240 comprises an uplink Resource Manager, which enables the NodeB 1202 to selectively allocate uplink PUSCH resources to the user device 1201. As would be understood by one of skill in the art, the components of the uplink resource manager may involve the physical (PHY) layer and/or the Media Access Control (MAC) layer of the transceiver 1240. Transceiver 1240 includes a Receiver(s) 1242 for receiving transmissions from various UE within range of the NodeB and transmitter(s) 1244 for transmitting data and control information to the various UE within range of the NodeB.

The uplink resource manager executes instructions that control the operation of transceiver 1240. Some of these instructions may be located in memory 1232 and executed when needed on processor 1230. The resource manager controls the transmission resources allocated to each UE that is being served by NodeB 1202 and broadcasts control information via the physical downlink control channel PDCCH.

Symbol processing circuitry 1238 performs demodulation using known techniques. ACKNAK information received from UE 1201 is de-modulated using an agreed upon bundled scheme as described in more detail above. The specific bundling and UL/DL allocation scheme that a given UE is to use may be communicated from the NodeB to the UE via a control transmission. Alternately, the specific bundling scheme may be agreed upon and each UE in the network is configured accordingly in an offline manner, for example.

During transmission and reception of voice data or other application data, receiver 1242 receives bundled ACKNAK information via the PUCCH link from UE 1201, as described in more detail above. A bundled ACK/NAK is received on a UL subframe in PUCCH in correspondence to a set of DL packets. As described in more detail above for TDD, different subframes are allocated for downlink (DL) or uplink (UL) transmissions. In order for the UE to determine if it has missed a DL grant, an M-bit DAI field is included in each DL grant. In one embodiment, the field may be a multi-bit field that is incremented by NodeB 1202 for each DL grant, as discussed in more detail with respect to FIGS. 3-7. In another embodiment, this field may be a one-bit field in which a toggle bit is used by the UE to infer if a DL grant has been missed, as described above in more detail with regard to FIGS. 8-11. In another embodiment, this field may contain a modulo value indicative of how many DL grants the NodeB is transmitting to UE 1201, as described in more detail above. In this embodiment, the DL detection scheme is embodied by executing instructions stored in memory 1232 by processor 1230. In other embodiments, the DL detection scheme may be embodied by a separate processor/memory unit, by a hard-wired state machine, or by other types of control logic, for example.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to DL transmission, it can be equally applied to UL transmission. The described method applies to any systems where ACK/NAK bundling is implemented, including but not limited to TDD, FDD, and HD-FDD systems. The described method can also be applied to transmission of other bundled feedback information, wherein a UE is required to detect if any scheduling grant is missed.

While thirty-six potential ACK/NAK channels are defined in the present embodiments for one resource block, not all thirty-six channels are used simultaneously. In another embodiment the size of a resource block and the resultant number of potential channels may be increased or decreased.

The term "frame" and "subframe" are not restricted to the structure of FIG. 2 and FIG. 3. Other configurations of frames and/or subframes may be embodied. In general, the term "frame" may refer to a set of one or more subframes. A transmission instance likewise refers to a frame, subframe, or other agreed upon quantity of transmission resource.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for providing bundled feedback in a wireless network wherein plural downlink (DL) subframes are associated with a single uplink (UL) subframe, comprising:
   receiving one or more downlink (DL) grants indicative of one or more corresponding DL packets, wherein each downlink (DL) grant comprises a downlink assignment indicator (DAI) indicative of a number of downlink (DL) grants in a current set of subframes;
   determining if at least one downlink (DL) grant was missed using the one or more received downlink assignment indicators (DAI) of plural downlink (DL) subframes associated with a single uplink (UL) subframe; and
   generating a bundled feedback for the one or more received DL packets, said bundled feedback having fewer bits than the number of the plural downlink (DL) subframes associated with the single uplink (UL) subframe;
   transmitting said bundled feedback on the single uplink (UL) subframe.

2. The method of claim 1, wherein the downlink assignment indicator (DAI) is an M-bit field, and wherein determining if at least one downlink (DL) grant was missed using the one or more received downlink assignment indicators (DAI) comprises:
determining that at least one downlink (DL) grant was missed if the value of the M-bit field of the first received downlink (DL) grant does not correspond to a default value.

3. The method of claim 1, wherein the downlink assignment indicator (DAI) is an M-bit field, and wherein determining if at least one downlink (DL) grant was missed using the one or more received downlink assignment indicators (DAI) comprises:
determining that at least one downlink (DL) grant was missed if the value of the M-bit field of each successively received downlink (DL) grant is not incremented by a pre-determined amount.

4. The method of claim 3, wherein the pre-determined amount is one.

5. The method of claim 1, wherein the downlink assignment indicator (DAI) is an M-bit field, and wherein determining if at least one downlink (DL) grant was missed using the one or more received downlink assignment indicators (DAI) comprises:
determining that at least one downlink (DL) grant was missed if the value of the M-bit field of each successively received downlink (DL) grant modulo a maximum value of the M-bit field is not incremented by a pre-determined amount.

6. The method of claim 5, wherein the pre-determined amount is one.

7. The method of claim 1, wherein the downlink assignment indicator (DAI) is a one-bit field.

8. The method of claim 1, wherein the downlink assignment indicator (DAI) is a two-bit field.

9. The method of claim 1, wherein generating a bundled feedback for the received DL packet(s) comprises:
generating a discontinuous transmission (DTX) as the bundled feedback when it is determined that at least one downlink (DL) grant was missed; and
transmitting nothing as the bundled feedback in an uplink transmission instance corresponding to the one or more received DL packets.

10. The method of claim 1, further comprises:
determining a feedback channel associated with a last received downlink (DL) grant; and
transmitting the bundled feedback in an uplink transmission instance corresponding to the one or more received DL packets using the feedback channel associated with the last received downlink (DL) grant.

11. A method for providing bundled feedback in a wireless network wherein plural downlink (DL) subframes are associated with a single uplink (UL) subframe, comprising:
receiving one or more downlink (DL) grants indicative of one or more corresponding DL packets, wherein each downlink (DL) grant comprises a downlink assignment indicator (DAI) indicative of a number of downlink (DL) grants in a current set of subframes,
determining if at least one downlink (DL) grant was missed using the one or more received downlink assignment indicators (DAI) of plural downlink (DL) subframes associated with a single uplink (UL) subframe;
generating a bundled feedback for the one or more received DL packets, said bundled feedback having fewer bits than the number of the plural downlink (DL) subframes associated with the single uplink (UL) subframe;
transmitting said bundled feedback on the single uplink (UL) subframe;
wherein receiving one or more downlink (DL) grants comprises:
monitoring for downlink (DL) grant(s) in a set of downlink (DL) subframes indexed by $\{1, 2, \ldots, N\}$, wherein at most one downlink (DL) grant is assigned in one downlink (DL) subframe;
receiving one or more downlink (DL) grants in a subset of T downlink (DL) subframes, increasingly indexed by $\{S(1), S(2), \ldots, S(T)\}$, wherein $1 \leq T \leq N$ and $1 \leq S(T) \leq N$;
wherein the downlink assignment indicator (DAI) is an M-bit field;
wherein the value of the M-bit field $C_{S(n)}$ for each of the n-th received downlink (DL) grant in downlink (DL) subframe S(n) is $C_{S(n)} = (m-1) \mod 2^M + 1$; and
wherein $n \leq T$ and $M \geq 1$; and wherein m is the number of assigned downlink (DL) grants within the subset of downlink (DL) subframes indexed by $\{1, 2, \ldots, S(n)\}$.

12. The method of claim 11, wherein generating the bundled feedback further comprises:
receiving at least one block of data transmitted using a set of resource blocks in downlink (DL) subframe S(n) indicated by the n-th received downlink (DL) grant; and
generating either a positive or a negative acknowledgement $A_n$ for the received block of data in downlink (DL) subframe S(n).

13. The method of claim 12, further comprising:
deriving the value $C_{s(T)}$ using the value of the M-bit DAI field in the last received downlink (DL) grant in downlink (DL) subframe S(T); and
deriving a feedback channel indexed by I associated with the last received downlink (DL) grant.

14. The method of claim 13, further comprising:
generating a positive acknowledgement as the bundled feedback, if $C_{S(T)} = (T-1) \mod 2^M + 1$ and $A_1, A_2, \ldots, A_T$ are all positive acknowledgements; and
transmitting the positive acknowledgement using the feedback channel I associated with the last received downlink (DL) grant.

15. The method of claim 13, further comprising:
Generating a negative acknowledgement as the bundled feedback, if $C_{S(T)} = (T-1) \mod 2^M + 1$ and at least one of $A_1, A_2, \ldots, A_T$ is a negative acknowledgement; and
transmitting the negative acknowledge using the feedback channel I associated with the last received downlink (DL) grant.

16. The method of claim 13, further comprising transmitting nothing on the feedback channel I associated with the last received downlink (DL) grant, if $C_{S(T)} \neq (T-1) \mod 2^M + 1$.

17. An apparatus for providing bundled feedback in a wireless network wherein plural downlink (DL) subframes are associated with a single uplink (UL) subframe, comprising:
processing circuitry coupled to receiving circuitry and to transmitting circuitry,
wherein the receiving circuitry is operable to receive one or more downlink (DL) grants indicative of one or more corresponding DL packets, wherein each downlink (DL) grant comprises a downlink assignment indicator (DAI) indicative of a number of downlink (DL) grants in a current set of subframes;
wherein the processing circuitry is operable to determine if at least one downlink (DL) grant was missed using the one or more received downlink assignment indicators (DAI) of plural downlink (DL) subframes associated with a single uplink (UL) subframe; and wherein the transmitting circuitry is operable to generate a bundled feedback for the one or more received DL packets, said bundled feedback having fewer bits than the number of the plural downlink (DL) subframes associated with the single uplink (UL) subframe.

18. The apparatus of claim 17 being a cellular telephone.

19. A method for receiving bundled feedback in a wireless network wherein plural downlink (DL) subframes are associated with a single uplink (UL) subframe, comprising:

transmitting to a user equipment (UE) one or more downlink (DL) grants indicative of one or more corresponding DL packets, wherein each downlink (DL) grant comprises a downlink assignment indicator (DAI) indicative of a number of downlink (DL) grants in a current set of subframes;

transmitting to the UE one or more blocks of data using a set of resource blocks indicated by the one or more downlink (DL) grants of plural downlink (DL) subframes associated with a single uplink (UL) subframe;

receiving from the UE a bundled acknowledgement for the one or more blocks of data in an uplink transmission instance corresponding to the one or more downlink (DL) grants, said bundled acknowledgement having fewer bits than the number of the plural downlink (DL) subframes associated with the single uplink (UL) subframe; and determining that at least one downlink (DL) grant was missed by the UE when the bundled acknowledgement is received on a channel that does not correspond to the last transmitted downlink (DL) grant.

20. The method of claim 19, wherein the downlink assignment indicator (DAI) is an M-bit field: and wherein transmitting the one or more downlink (DL) grants comprises incrementing the value of the M-bit field in each successively transmitted downlink (DL) grant by a pre-determined amount.

21. The method of claim 20, wherein the pre-determined amount is one.

22. The method of claim 20, wherein the downlink assignment indicator (DAI) is a two-bit field.

23. The method of claim 19, wherein the downlink assignment indicator (DAI) is an M-bit field: and wherein transmitting the one or more downlink (DL) grants comprises incrementing the value of the M-bit field in each successively transmitted downlink (DL) grant modulo a maximum value of the M-bit DAI field by a pre-determined amount.

* * * * *